May 19, 1942.  E. STROM  2,283,588
VEHICLE JACK STRUCTURE
Filed June 24, 1940  2 Sheets-Sheet 2
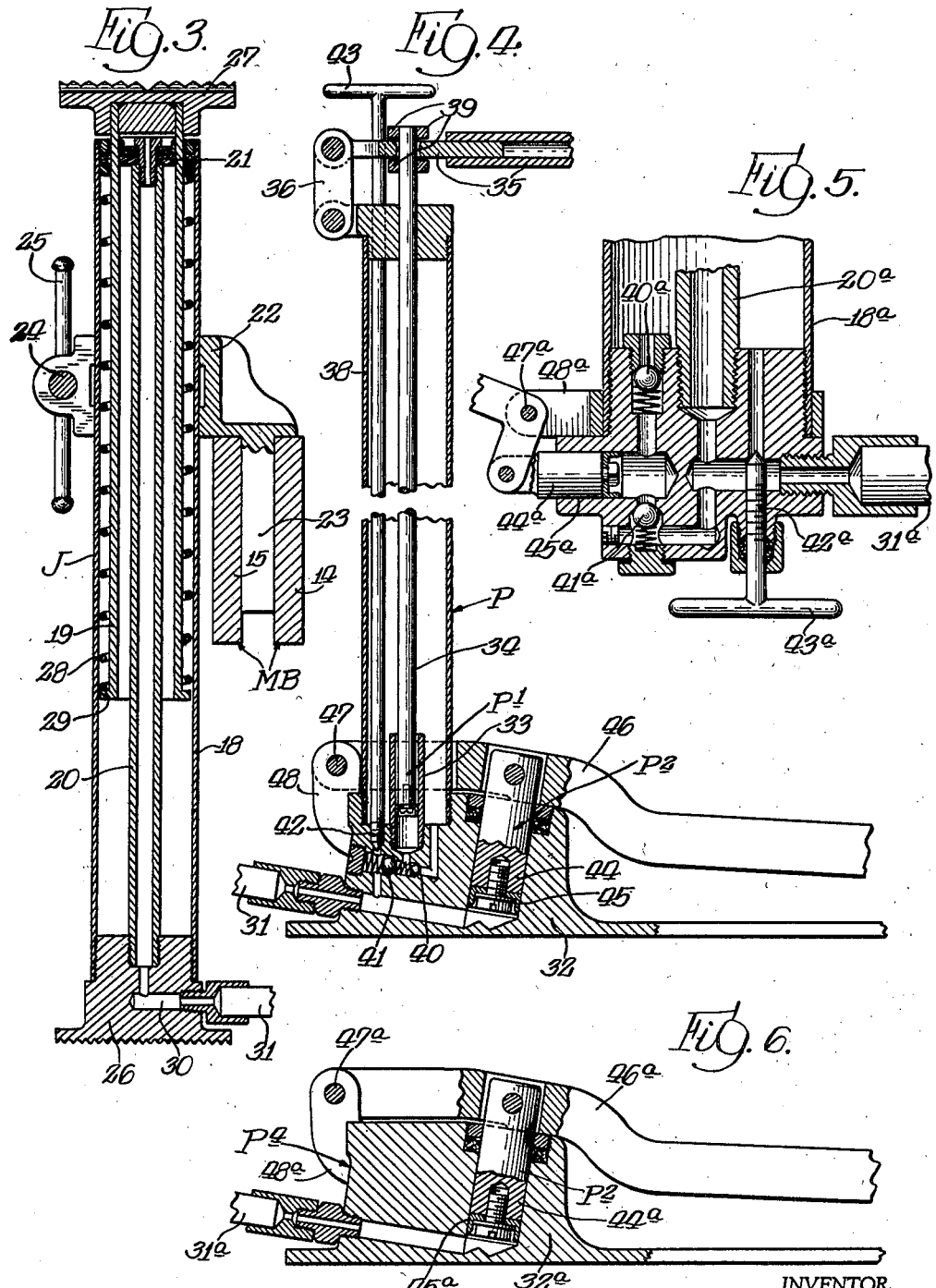
INVENTOR.
Ernest Strom,
BY Bair & Freeman
Attys Patented May 19, 1942

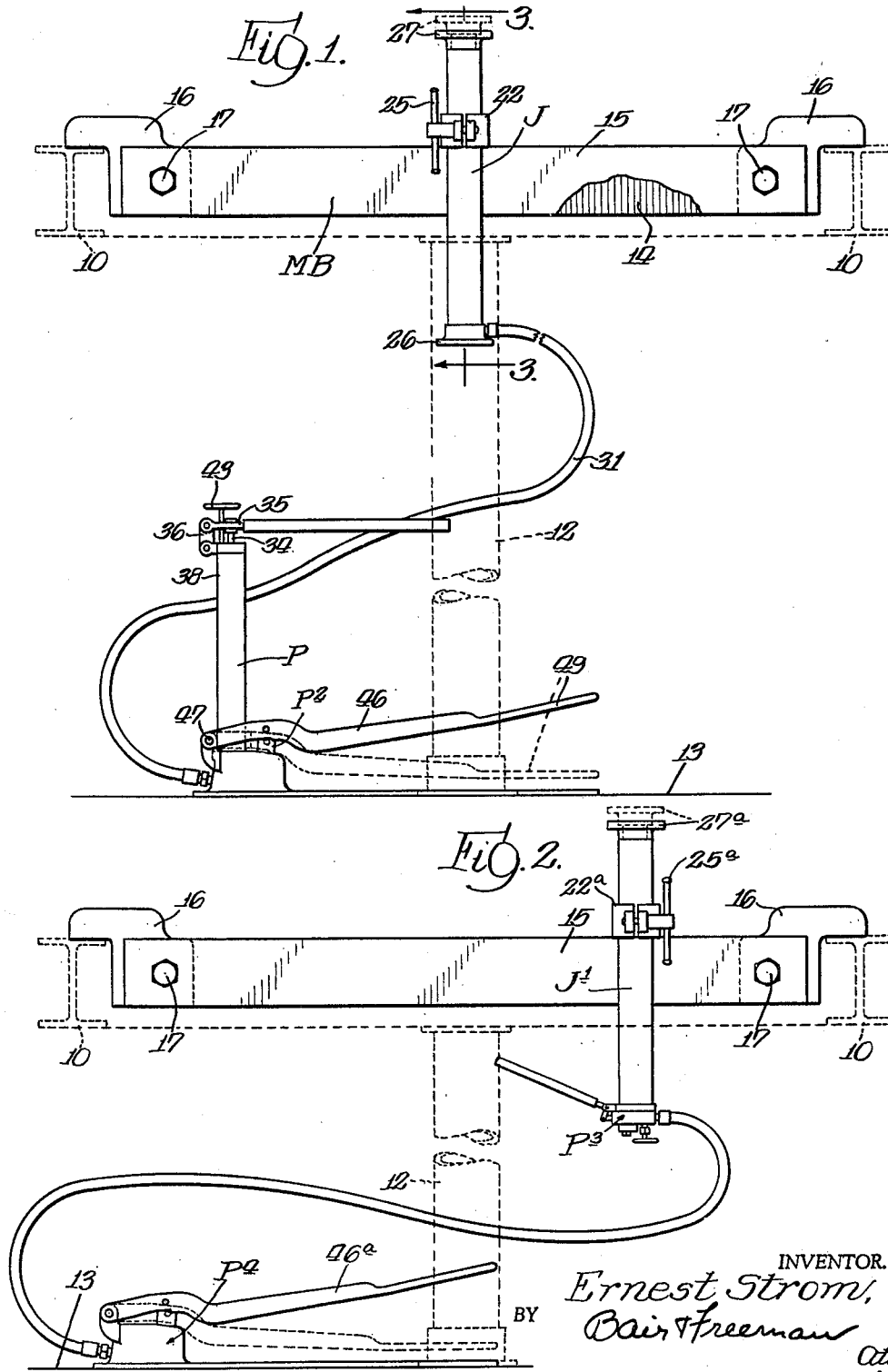

2,283,588

UNITED STATES PATENT OFFICE 2,283,588

VEHICLE JACK STRUCTURE

Ernest Strom, St. Paul, Minn., assignor to Vulcan Manufacturing Co., Inc., St. Paul, Minn., a corporation of Minnesota Application June 24, 1940, Serial No. 342,135

10 Claims. (Cl. 73—51)

My invention relates to a vehicle jack structure which can be used as a "pit" or automobile lift jack and at the same time as a "jiggle" jack.

One object of my invention is to provide a jack structure preferably of hydraulic character which may be mounted on the lifting rails of an automobile lift and adjusted to engage any desired part of the automobile, such as the chassis when lubricating the springs of the automobile, and to elevate such part so that the lubricant can more effectively enter the spring shackles and other parts being lubricated.

A further object is to provide a foot operated unit for reciprocating the jack so that the automobile may be rocked while the lubricating operation is being performed.

Still a further object is to provide mechanism for accomplishing the purpose of elevating a portion of an automobile relative to a lift and thereafter raising and lowering such portion in a convenient manner from the floor under the lift or from the floor of a pit, thereby permitting the service station attendant to have his hands free for operating his lubricating equipment.

The foregoing, other and further objects of the invention will be apparent to those skilled in the art to which this invention appertains, by reference to the following description, accompanying drawings and appended claims. Embodiments of the invention are illustrated in the accompanying drawings, in which the views thereof are as follows:

Figure 1 is an elevation of a preferred form of my vehicle jack showing a lift in dotted lines;

Figure 2 is a similar view showing a modification of the apparatus shown in Figure 1 for effecting the same purpose;

Figure 3 is an enlarged vertical sectional view on the line 3—3 of Figure 1;

Figure 4 is an enlarged vertical sectional view of the unit on the floor in Figure 1;

Figure 5 is an enlarged sectional view of the lower end of the jack member of Figure 2, and Figure 6 is an enlarged vertical sectional view of the unit mounted on the floor in Figure 2.

On the accompanying drawings, I have used the reference numerals 10 to indicate the vehicle supporting rails of a lift. A plunger 12 is illustrated as having elevated the rails 10 to a position above a floor 13.

In connection with the rails 10 or with the supporting runways of a lubricating pit, I provide a mounting bar MB comprising a pair of flat steel bars 14 and 15 connected together at their ends by castings 16 and bolts 17. The mounting bar MB may be adjusted as desired along the rails 10 or along the supporting runways of a lubricating pit.

Carried by the mounting bar MB is a jack structure J comprising an outer cylinder 18, an inner cylinder 19, a hollow piston rod 20 and a piston 21. The outer cylinder 18 is supported by a split clamp 22 having a shank 23 received between the bars 14 and 15 so that the clamp may be slid longitudinally of the mounting bar MB to any desired position therealong. A clamp screw 24 having a handle 25 is provided for holding the jack member J at any desired elevation relative to the mounting bar MB.

The lower ends of the cylinder 18 and the piston rod 20 are connected with a base member 26 of the jack J. The upper end of the inner cylinder 19 is connected to a head 27. A spring 28 within the cylinder 18 and surrounding the cylinder 19 engages a flange 29 on the lower end of the cylinder 19 to effect retraction of the cylinder 19 relative to the cylinder 18 when expulsion of oil from the jack is permitted through a passageway 30 in the base member 26 and a flexible hose 31.

The flexible hose 31 extends to a pump unit P consisting of a base member 32, a first pump P—1 and a second pump P—2. The pump P—1 consists of a cylinder 33, a plunger 34 and a lever 35 for operating the plunger. The lever 35 is connected by a link 36 to a reservoir cylinder 38 extending upwardly from the base member 32 and is operatively connected by collars 39 with the pump plunger 34.

Inlet and outlet check valves 40 and 41, respectively, are associated with the pump P—1. A needle valve 42 terminating in a controlling handle 43 is provided for controlling the return of oil from the flexible hose 31 to the reservoir 38.

The pump P—2 consists of a plunger 44 in a cylinder bore 45 of the base member 32. A foot lever 46 is provided for operating the plunger 44, the lever being pivoted at 47 to an ear 48 extending from the base member 32. The outer end of the foot lever 46 is provided with a foot pedal 49.

In Figures 2, 5 and 6, I show a modification wherein a jack member J—1 is illustrated in place of the jack member J of Figure 1. In place of the pump P—1 of Figure 4, a pump P—3 is provided at the base of the jack member J—1, whereas in place of the pump P—2 a pump P—4 is provided. The pump P—4 is an individual unit instead of being combined with the pump P—3 as in Figure 4. In Figures 2, 5 and 6, most of the parts have counterparts in Figures 1, 3 and 4. Such parts are accordingly given the same reference characters with the addition of the letter *a*.

*Practical operation*

In the operation of my vehicle jack structure, as shown in Figures 1, 3 and 4, after the lift 10—12 has been operated to elevate an automobile the mounting bar MB may be slid to the desired position, the jack member J may be slid to the desired lateral position, the clamp screw 24 loosened and the jack member elevated to contact with the desired portion of the automobile. The pump P—1 may then be operated for elevating such part of the automobile to the desired degree. Thereafter the automobile may be "jiggled" by stepping on the foot pedal 49 and alternately depressing it to the dotted position of Figure 1 and then permitting it to rise to the full line position. The weight of the automobile of course will, in addition to the spring 28, return the foot lever of the plunger 44 to the elevated full line position. Thus the automobile may be rocked for effectively lubricating certain portions thereof or for any other desired purpose.

The flexible hose 31 permits elevation of the lift relative to the pump unit P mounted on the floor and permits positioning of the unit P to a location handy to the attendant. By using his foot to effect the rocking of the car, his hands are free to manipulate the various lubricating apparatus as required. After my jack structure has been used, decline of the jack away from the portion of the automobile which it engages is readily effected by opening the needle valve 42, thereby permitting return of oil from the jack member to the reservoir 38.

The operation of the form of invention illustrated in Figures 2, 5 and 6 is substantially the same as already described, the difference being that the pump P—3 is elevated with the lift, whereas only the pump P—4 for rocking the automobile remains on the floor. Aside from this difference, the operation is believed obvious.

It will be noted that the jack structure J of Figure 1 has similar end members 26 and 27 so that, if desired, the jack can be used as a portable jack for other lifting operations. When the jack is mounted on the mounting bar MB, it may be readily adjusted as desired to effect elevation of any desired portion of the automobile with respect to the lifting rails or pit runways.

My jack arrangement is such that it prevents any possibility of the lift, when being lowered, throwing the car off the lifting rails as in the case of pit or lift jacks that extend all the way to the pit floor or the floor under the lift.

Having described two specific embodiments of my invention together with the operation thereof, I desire it to be understood that these forms are selected merely for the purpose of facilitating disclosure of the invention rather than for the purpose of limiting the number of forms which it may assume. It is to be further understood that various modifications, adaptations and alterations may be applied to the specific forms disclosed to meet the requirements of practice without in any manner departing from the spirit and scope of the present invention except as set forth in the claims appended hereto.

I claim as my invention and desire to secure by Letters Patent of the United States:

1. In a vehicle jack structure, a mounting bar adapted to span the lifting rails of an automobile lift, a jack member carried thereby and adjustable longitudinally of said mounting bar, means for adjusting the elevation of said jack member relative to said mounting bar, said jack member comprising extensible cylinder and piston means, a pump for pumping oil to said cylinder and piston means to effect extension thereof, a second pump, and a flexible hose connecting said second pump hydraulically with said cylinder and piston means, said second pump being adapted to effect relative reciprocation of said cylinder and piston upon operation of said second pump, and having a foot lever adapted to be alternately depressed and released for effecting such reciprocation.

2. In a vehicle jack structure, a mounting bar adapted to span the lifting rails of an automobile lift and to be elevated with said lifting rails above a floor surface, a jack member carried thereby and adjustable longitudinally of said mounting bar, said jack member comprising extensible cylinder and piston means, a pump for pumping oil to said cylinder and piston means to effect extension thereof, a second pump adapted to be mounted on such floor surface, a flexible hose connecting said second pump with said cylinder and piston means, said second pump being adapted to effect relative reciprocation of said cylinder and piston upon operation of said second pump, and having a foot lever adapted to be alternately depressed and released for effecting such reciprocation.

3. In a vehicle jack structure, a mounting bar adapted to span a pair of runways for a vehicle, a jack member carried thereby, said jack member comprising extensible cylinder and piston means, a pump for pumping oil to said cylinder and piston means to effect extension thereof, a second pump constituting a unit independent of said cylinder and piston means, and a flexible hose connecting said unit hydraulically with said cylinder and piston means and adapted to effect relative reciprocation thereof upon operation of said second pump, said second pump being foot operated.

4. In a vehicle jack structure, a mounting bar adapted to span a pair of runways for supporting a vehicle, a jack member carried thereby and adjustable longitudinally thereof, means for adjusting the elevation of said jack member relative to said mounting bar, said jack member comprising extensible cylinder and piston means, a pump located in the base of said jack member for pumping oil to said cylinder and piston means to effect extension thereof, a flexible hose having its inner end connected with said cylinder and piston means, and means at the outer end of said hose adapted to be operated by foot power for alternately receiving and displacing oil relative thereto through said flexible hose to effect relative reciprocation of said cylinder and piston means.

5. In a vehicle jack structure, a jack member comprising extensible cylinder and piston means, a pump located in the base of said jack member for pumping oil to said cylinder and piston means to effect extension thereof, a flexible hose connected at one end with said cylinder and piston means, and means at the other end of said hose for alternately receiving and displacing oil relative to said hose to effect relative reciprocation of said cylinder and piston means.

6. In a vehicle jack structure, a mounting bar adapted to span the lifting rails of an automobile lift, a jack member carried thereby and adjustable longitudinally thereof, means for adjusting the elevation of said jack member relative to said mounting bar, said jack member comprising extensible cylinder and piston means, a pump for pumping oil to said cylinder and piston means to effect extension thereof, a flexible hose connected at one end with said cylinder and piston means, and means connected with the other end of said hose and adapted to be operated by foot power for alternately receiving and displacing oil to effect relative reciprocation of said cylinder and piston means.

7. In a vehicle jack structure, a jack member comprising extensible cylinder and piston means, a unit adapted to be mounted remote from said jack member, a flexible hose connecting said unit with said jack member, said unit including a pump for pumping oil through said flexible hose to said cylinder and piston means to effect extension thereof, and a second pump operable to alternately displace oil into said hose and permit return of oil therefrom to said second pump to effect relative reciprocation of said cylinder and piston means, said second pump having a foot lever for operating the same.

8. In a vehicle jack structure, a mounting bar adapted to span the lifting rails of an automobile lift, a jack member carried thereby and adjustable longitudinally thereof, means for adjusting the elevation of said jack member relative to said mounting bar, said jack member comprising extensible cylinder and piston means, a unit adapted to be mounted remote from said jack member, a flexible hose connecting said unit with said jack member, said unit including a pump for pumping oil through said flexible hose to said cylinder and piston means to effect extension thereof, and a second pump operable to alternately displace oil into said hose and permit return of oil therefrom to said second pump to effect relative reciprocation of said cylinder and piston means.

9. In a jack structure of the character disclosed, a jack unit, means for supporting said jack unit, a unit separate from said jack unit and supporting means and adapted to be mounted remote from said jack member, flexible means operably connecting said second unit with said jack unit, said second unit being operable to effect extension of said jack unit and having means operable to effect reciprocation thereof, said last means having a foot lever for operating the same.

10. In a vehicle jack structure, a mounting bar adapted to span the lifting rails of an automobile lift, a jack member carried thereby and adjustable longitudinally thereof, means for adjusting the elevation of said jack member relative to said mounting bar, means for operating said jack member to raise a portion of an automobile supported on said lifting rails relative to said mounting bar, and means for alternately raising and lowering the portion of said jack member engaging the automobile to rock the automobile, said last means being independent of said mounting bar and jack member, remotely positionable relative to said jack member and including a foot member for operating the same.

ERNEST STROM.